United States Patent
Fukuoka et al.

(10) Patent No.: US 9,134,577 B2
(45) Date of Patent: Sep. 15, 2015

(54) LIQUID CRYSTAL DISPLAY DEVICE

(75) Inventors: Nobuko Fukuoka, Saitama (JP); Arihiro Takeda, Saitama (JP); Jin Hirosawa, Saitama (JP)

(73) Assignee: Japan Display Inc., Tokyo (JP)

(*) Notice: Subject to any disclaimer, the term of this patent is extended or adjusted under 35 U.S.C. 154(b) by 175 days.

(21) Appl. No.: 13/350,337

(22) Filed: Jan. 13, 2012

(65) Prior Publication Data

US 2012/0182501 A1 Jul. 19, 2012

(30) Foreign Application Priority Data

Jan. 19, 2011 (JP) .................. 2011-008776

(51) Int. Cl.
*G02F 1/1343* (2006.01)

(52) U.S. Cl.
CPC .............. *G02F 1/134336* (2013.01); *G02F 2001/134381* (2013.01)

(58) Field of Classification Search
CPC ............. G02F 1/136286; G02F 1/133707; G02F 1/134336; G02F 1/134363; G02F 1/134309; G02F 1/1345; G02F 1/1393; G02F 1/136213; G02F 2001/134345
USPC .................................. 349/139, 141
See application file for complete search history.

(56) References Cited

U.S. PATENT DOCUMENTS

| | | | |
|---|---|---|---|
| 6,266,116 B1 | 7/2001 | Ohta et al. | |
| 6,888,609 B2 | 5/2005 | Iizuka et al. | |
| 7,688,416 B2 | 3/2010 | Fukuoka et al. | |
| 7,924,393 B2 | 4/2011 | Fukuoka et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0030428 A1* | 2/2007 | Lu et al. | 349/126 |
| 2007/0115234 A1 | 5/2007 | Kim et al. | |
| 2008/0062358 A1 | 3/2008 | Lee et al. | |
| 2008/0180590 A1 | 7/2008 | Lee et al. | |

(Continued)

FOREIGN PATENT DOCUMENTS

| | | |
|---|---|---|
| CN | 1181518 A | 5/1998 |
| CN | 1379269 A | 11/2002 |

(Continued)

OTHER PUBLICATIONS

U.S. Appl. No. 13/469,458, filed May 11, 2012, Takeda, et al.

(Continued)

*Primary Examiner* — Richard Kim
*Assistant Examiner* — Ryan Crockett
(74) *Attorney, Agent, or Firm* — Oblon, McClelland, Maier & Neustadt, L.L.P.

(57) ABSTRACT

A liquid crystal display device includes a first substrate including a T-shaped pixel electrode including a strip-shaped first main electrode positioned midway between a first source line and a second source line, and a strip-shaped sub-electrode, a second substrate including a counter-electrode which includes a strip-shaped second main electrode positioned above the first source line and the second source line, and a liquid crystal layer, wherein when an inter-electrode distance between the first main electrode and the second main electrode is L and a cell gap is GP, a formed angle $\Theta$, which is expressed by a relationship of $\tan \Theta = GP/L$, is greater than a pre-tilt angle $\alpha$ of a liquid crystal molecule.

14 Claims, 8 Drawing Sheets

(56) References Cited

U.S. PATENT DOCUMENTS

| | | |
|---|---|---|
| 2008/0180623 A1 | 7/2008 | Lee et al. |
| 2008/0186439 A1 | 8/2008 | Kwon et al. |
| 2009/0207363 A1 | 8/2009 | Hirosawa |
| 2010/0195037 A1 | 8/2010 | Imakawa et al. |
| 2010/0273276 A1* | 10/2010 | Lee et al. .......... 438/4 |
| 2011/0234947 A1* | 9/2011 | Hirosawa .......... 349/96 |

FOREIGN PATENT DOCUMENTS

| | | | |
|---|---|---|---|
| CN | 101013216 A | | 8/2007 |
| JP | 6-160878 A | | 6/1994 |
| JP | H06-160878 | * | 6/1994 |
| JP | 6-222397 | | 8/1994 |
| JP | 7-159807 | | 6/1995 |
| JP | 9-160041 | | 6/1997 |
| JP | 9-160042 | | 6/1997 |
| JP | 9-160061 | | 6/1997 |
| JP | 10-3092 A | | 1/1998 |
| JP | 10-26765 | | 1/1998 |
| JP | 10-48671 A | | 2/1998 |
| JP | H10-048671 | * | 2/1998 |
| JP | 10-90708 | | 4/1998 |
| JP | 2005-3802 | | 1/2005 |
| JP | 3644653 | | 2/2005 |
| JP | 2005-242307 | | 9/2005 |
| JP | 2009-192822 | * | 8/2009 |

OTHER PUBLICATIONS

U.S. Appl. No. 13/470,578, filed May 14, 2012, Takeda, et al.
Office Action issued Sep. 24, 2013 in Japanese Patent Application No. 2011-008776 with English language translation.
U.S. Appl. No. 13/542,049, filed Jul. 5, 2012, Takeda, et al.
U.S. Appl. No. 13/562,647, filed Jul. 31, 2012, Takeda, et al.
U.S. Appl. No. 13/369,057, filed Feb. 8, 2012, Hirosawa.
U.S. Appl. No. 13/405,799, filed Feb. 27, 2012, Hirosawa, et al.
U.S. Appl. No. 13/242,321, filed Sep. 23, 2011, Hirosawa, et al.
U.S. Appl. No. 13/339,915, filed Dec. 29, 2011, Takano, et al.
U.S. Appl. No. 13/348,906, filed Jan. 12, 2012, Morita, et al.
Combined Chinese Office Action and Search Report issued Jan. 6, 2014 in Patent Application No. 201210015569.6 (with English language translation).

* cited by examiner

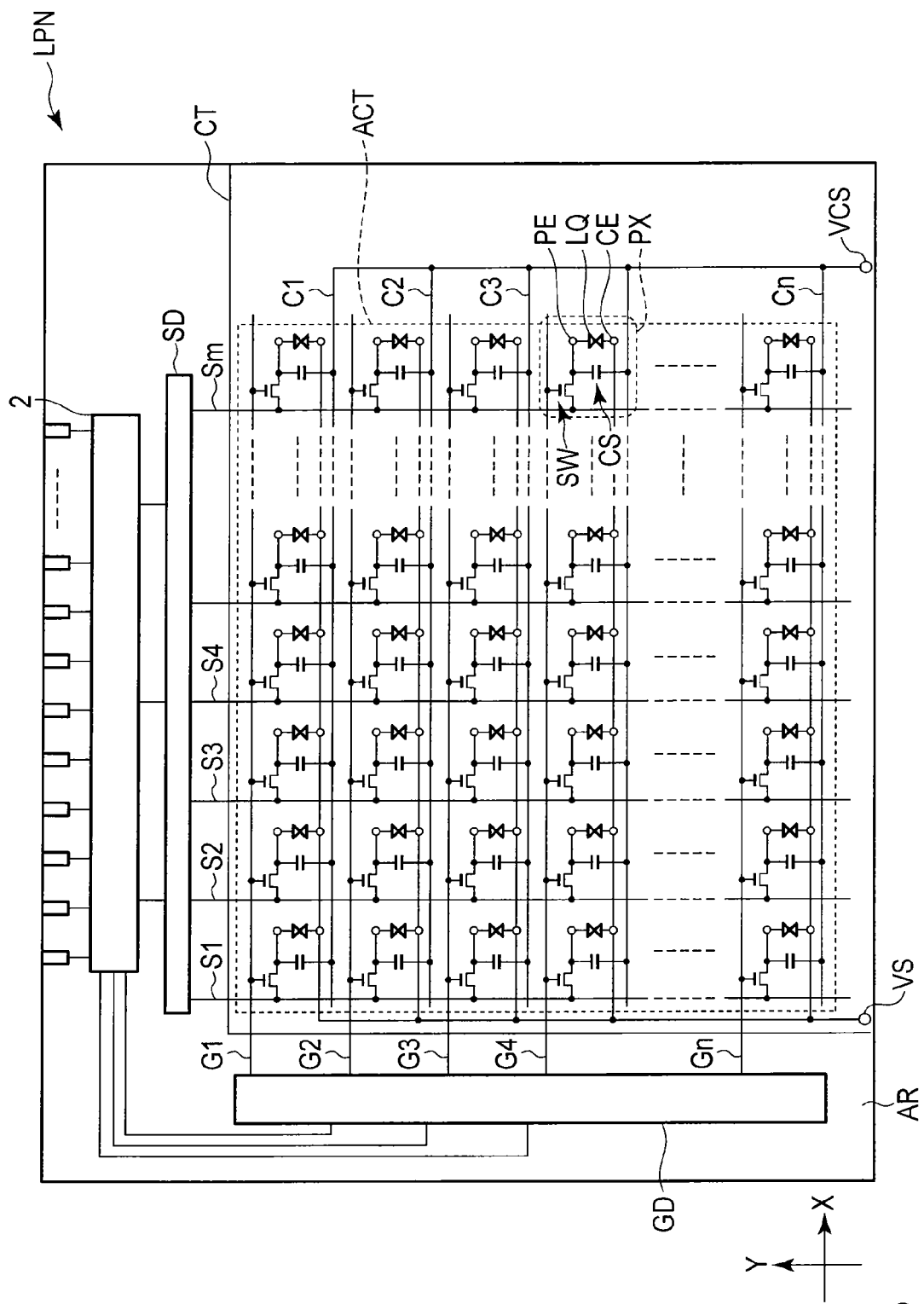
F I G. 2

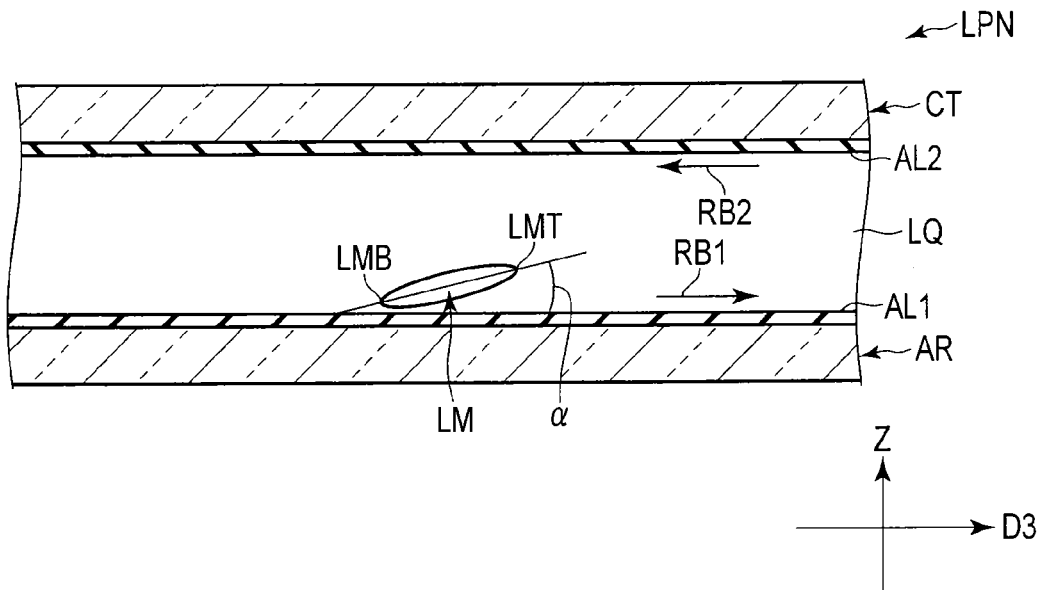
F I G. 7
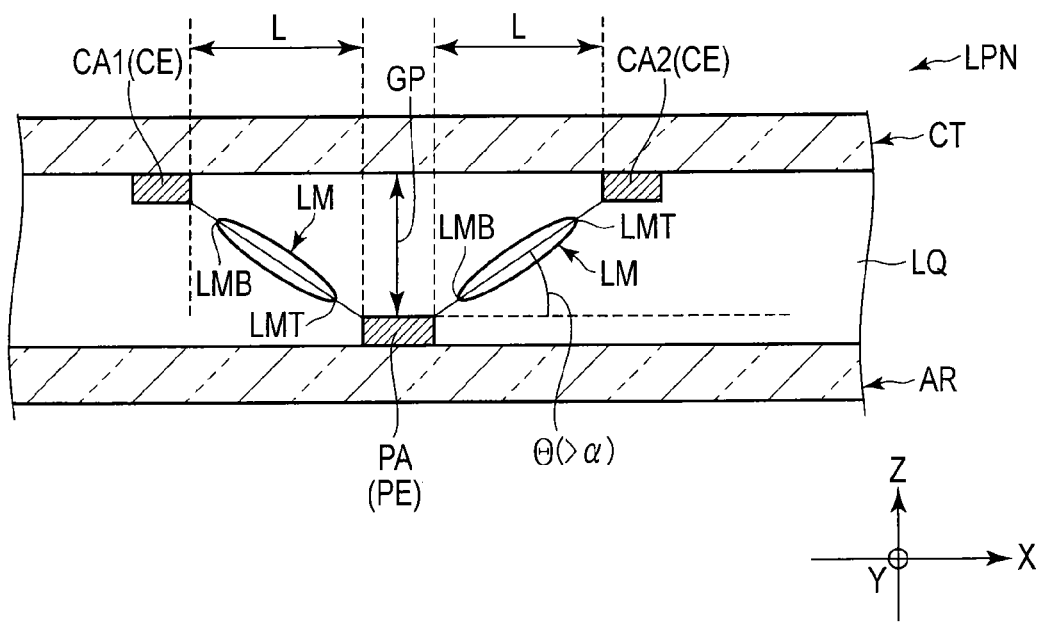
F I G. 8

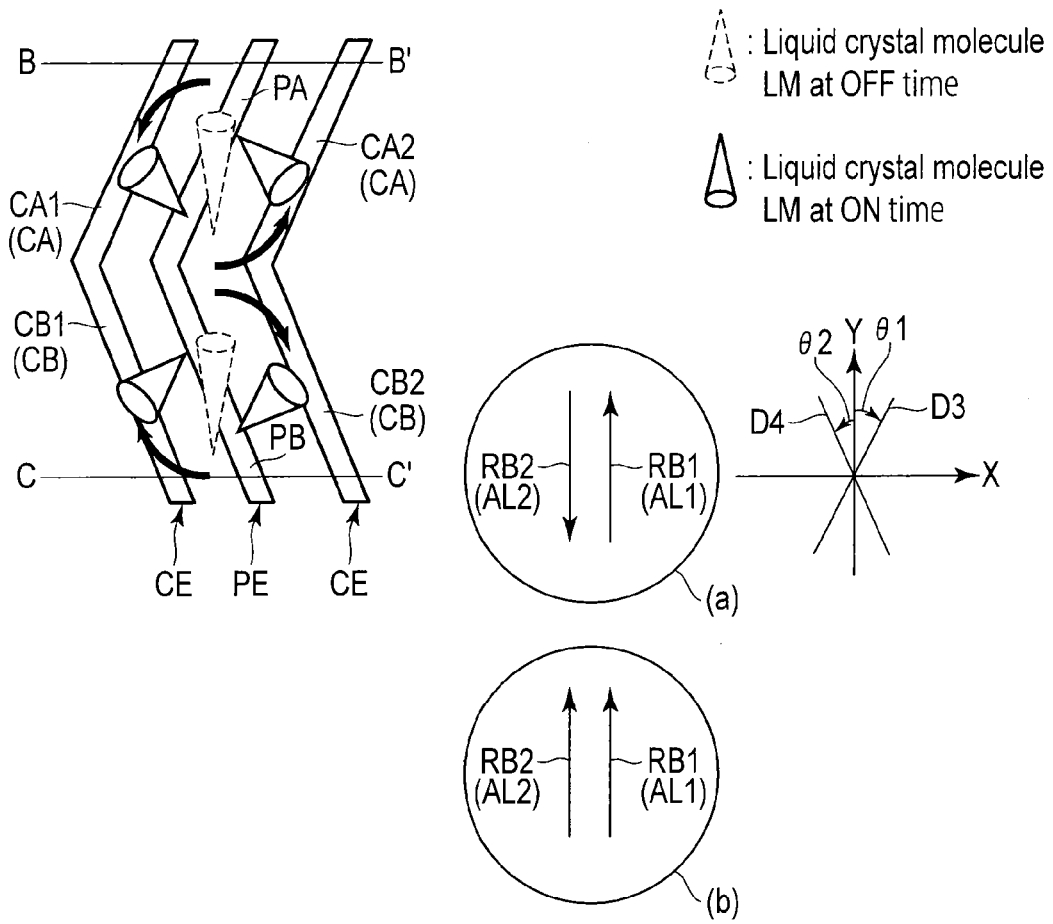
F I G. 9
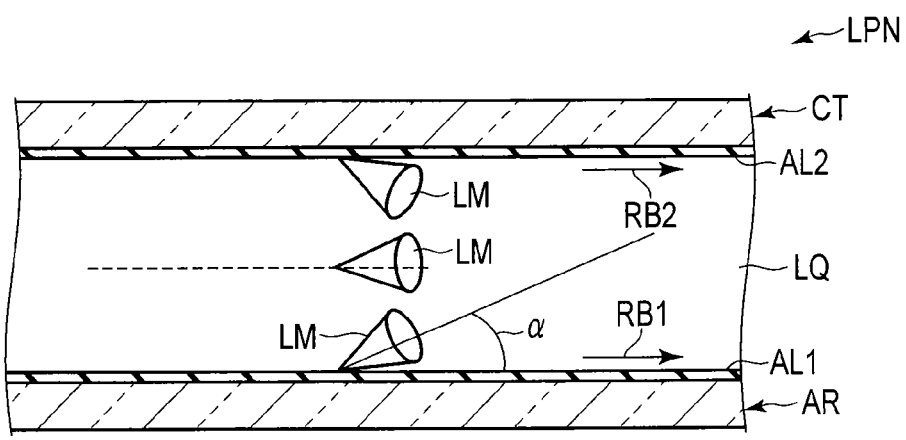
F I G. 11

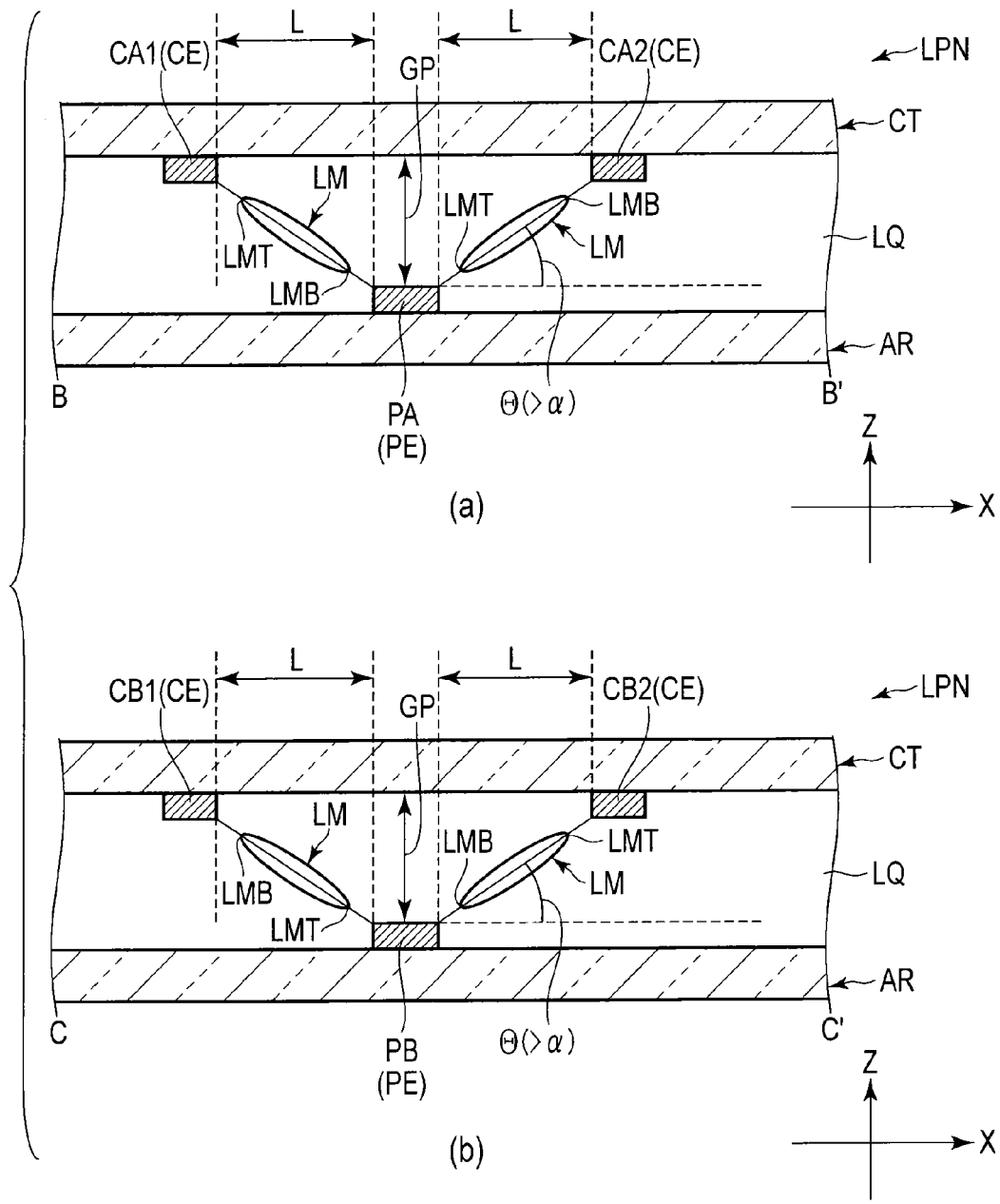
F I G. 10

LIQUID CRYSTAL DISPLAY DEVICE

CROSS-REFERENCE TO RELATED APPLICATIONS

This application is based upon and claims the benefit of priority from prior Japanese Patent Application No. 2011-008776, filed Jan. 19, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a view which schematically illustrates a structure and an equivalent circuit of a liquid crystal display panel shown in FIG. 1.

FIG. 7 is a schematic cross-sectional view of the liquid crystal display panel, for explaining a pre-tilt angle α of a liquid crystal molecule included in the liquid crystal layer.

FIG. 8 is a schematic cross-sectional view of the liquid crystal display panel, for explaining alignment states of liquid crystal molecules included in the liquid crystal layer.

FIG. 9 is a plan view which schematically shows a minimum unit structure in one pixel of another structure example of the embodiment.

FIG. 10 is a schematic cross-sectional view of the liquid crystal display panel, for explaining alignment states of liquid crystal molecules included in the liquid crystal layer.

FIG. 11 is a schematic cross-sectional view of the liquid crystal display panel, for explaining a pre-tilt angle α of splay-aligned liquid crystal molecules included in the liquid crystal layer.

DETAILED DESCRIPTION

Figure 1:
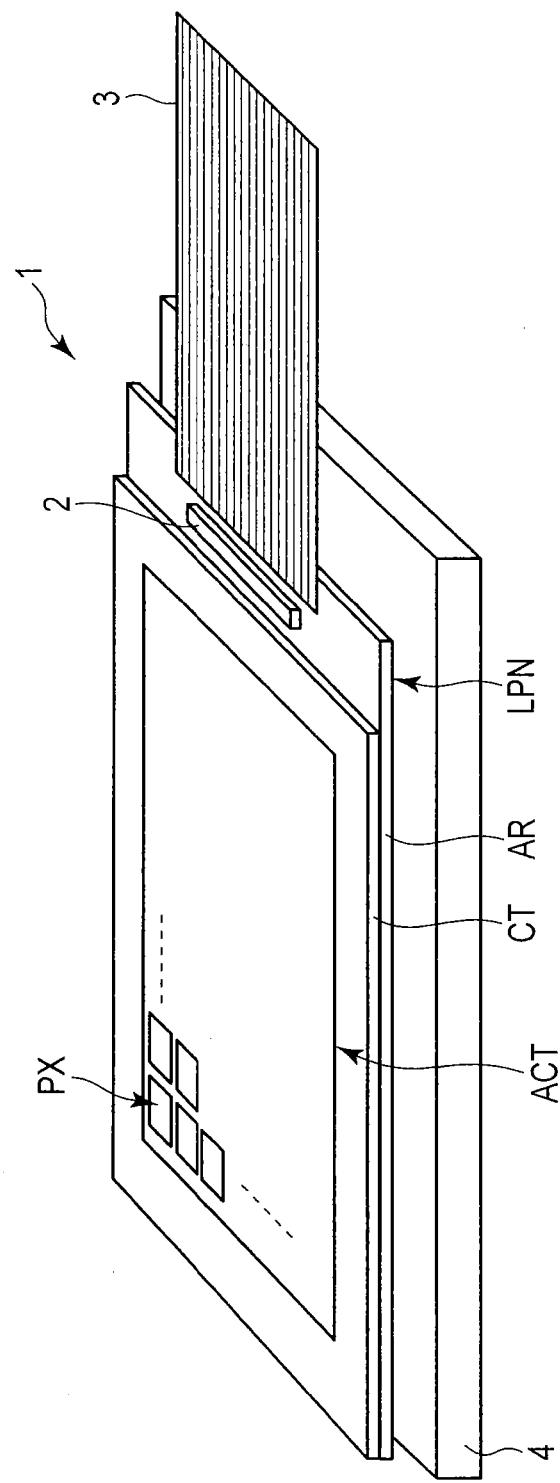
FIG. 1 schematically shows a structure of a liquid crystal display device according to an embodiment.

In general, according to one embodiment, a liquid crystal display device includes a first substrate including a gate line and a storage capacitance line which extend in a first direction, a first source line and a second source line which extend in a second direction perpendicular to the first direction, a T-shaped pixel electrode including a strip-shaped first main electrode, which is positioned midway between the first source line and the second source line and extends in the second direction, and a strip-shaped sub-electrode, which is continuous with the first main electrode, is positioned above the storage capacitance line and extends in the first direction, and a first alignment film formed of a material which exhibits horizontal alignment properties, the first alignment film covering the pixel electrode; a second substrate including a counter-electrode which includes a strip-shaped second main electrode positioned above the first source line and the second source line and extending in the second direction, and a second alignment film formed of a material which exhibits horizontal alignment properties, the second alignment film covering the counter-electrode; and a liquid crystal layer including a liquid crystal molecule held in a cell gap between the first substrate and the second substrate, wherein when an inter-electrode distance in the first direction between the first main electrode and the second main electrode is L and the cell gap is GP, a formed angle Θ, which is expressed by a relationship of tan Θ=GP/L, is greater than a pre-tilt angle α of the liquid crystal molecule.

According to another embodiment, a liquid crystal display device includes a first substrate including a gate line extending in a first direction, a first source line and a second source line which extend in a second direction perpendicular to the first direction, a pixel electrode including a strip-shaped first main electrode, which is positioned midway between the first source line and the second source line and extends in the second direction, and a sub-electrode extending from the first main electrode toward the first source line and the second source line, and a first alignment film formed of a material which exhibits horizontal alignment properties, the first alignment film covering the pixel electrode; a second substrate including a counter-electrode which includes a strip-shaped second main electrode positioned above the first source line and the second source line and extending in the second direction, and a second alignment film formed of a material which exhibits horizontal alignment properties, the second alignment film covering the counter-electrode; and a liquid crystal layer including a liquid crystal molecule held in a cell gap between the first substrate and the second substrate, wherein when an inter-electrode distance in the first direction between the first main electrode and the second main electrode is L and the cell gap is GP, a formed angle Θ, which is expressed by a relationship of tan Θ=GP/L, is greater than a pre-tilt angle α of the liquid crystal molecule.

According to another embodiment, a liquid crystal display device includes a first substrate including a gate line extending in a first direction, a pixel electrode including a strip-shaped first main electrode, which extends in a third direction crossing a second direction perpendicular to the first direction at an acute angle clockwise from the second direction, and a strip-shaped second main electrode, which extends in a fourth direction crossing the second direction at an acute angle counterclockwise from the second direction, and a first alignment film formed of a material which exhibits horizontal alignment properties, the first alignment film covering the pixel electrode; a second substrate including a counter-electrode which includes a strip-shaped third main electrode disposed on both sides of the first main electrode and extending in the third direction, and a strip-shaped fourth main electrode disposed on both sides of the second main electrode and extending in the fourth direction, and a second alignment film formed of a material which exhibits horizontal alignment properties, the second alignment film covering the counter-electrode; and a liquid crystal layer including a liquid crystal molecule which is held in a cell gap between the first substrate and the second substrate, and is initially aligned along the second direction at an OFF time when no electric field is produced between the pixel electrode and the counter-electrode, wherein an inter-electrode distance L in the first direction between the first main electrode and the third main electrode is substantially equal to an inter-electrode distance L in the first direction between the second main electrode and the fourth main electrode, and when the cell gap is GP, a formed angle $\Theta$, which is expressed by a relationship of $\tan \Theta = GP/L$, is greater than a pre-tilt angle $\alpha$ of the liquid crystal molecule.

Embodiments will now be described in detail with reference to the accompanying drawings. In the drawings, structural elements having the same or similar functions are denoted by like reference numerals, and an overlapping description is omitted.

FIG. 1 is a view which schematically shows a structure of a liquid crystal display device 1 according to an embodiment.

Specifically, the liquid crystal display device 1 includes an active-matrix-type liquid crystal display panel LPN, a driving IC chip 2 and a flexible wiring board 3 which are connected to the liquid crystal display panel LPN, and a backlight 4 which illuminates the liquid crystal display panel LPN.

The liquid crystal display panel LPN is configured to include an array substrate AR which is a first substrate, a counter-substrate CT which is a second substrate that is disposed to be opposed to the array substrate AR, and a liquid crystal layer which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The backlight 4, in the example illustrated, is disposed on the back side of the array substrate AR. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

FIG. 2 is a view which schematically shows a structure and an equivalent circuit of the liquid crystal display panel LPN shown in FIG. 1.

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend in a first direction X. In addition, the gate lines G and storage capacitance lines C neighbor at intervals along a second direction Y which is perpendicular to the first direction X, and are alternately arranged in parallel. The source lines S cross the gate lines G and storage capacitance lines C, and extend in the second direction Y. In addition, the source lines S are arranged in parallel along the first direction X. In the example illustrated, the gate lines G and storage capacitance lines C, on one hand, and the source lines S, on the other hand, are perpendicular to each other, but are electrically insulated from each other. It is not always necessary that each of the gate lines G, storage capacitance lines C and source lines S extend in a straight shape, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a counter-electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the counter-electrode CE is formed on the counter-substrate CT, and liquid crystal molecules of the liquid crystal layer LQ are switched by mainly using an electric field which is produced between the pixel electrodes PE and the counter-electrode CE. The electric field, which is produced between the pixel electrodes PE and the counter-electrode CE, is an oblique electric field which is slightly inclined to an X-Y plane which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW may be formed of, for example, polysilicon, or amorphous silicon. In the active area ACT, an (m×n) number of switching elements SW are formed.

The pixel electrodes PE are disposed in the respective pixels PX, and are electrically connected to the switching elements SW. The counter-electrode CE has, for example, a common potential, and is disposed common to the pixel electrodes PE of plural pixels PX via the liquid crystal layer LQ. The pixel electrodes PE and counter-electrode CE are formed of a light-transmissive electrically conductive material such as indium tin oxide (ITO) or indium zinc oxide (IZO). However, the pixel electrodes PE and counter-electrode CE may be formed of other metallic material such as aluminum.

The array substrate AR includes a power supply module VS for applying a voltage to the counter-electrode CE. The power supply module VS is formed, for example, on the outside of the active area ACT. The counter-electrode CE of the counter-substrate CT is led out to the outside of the active area ACT, and is electrically connected to the power supply module VS via an electrically conductive member (not shown).

Figure 3:
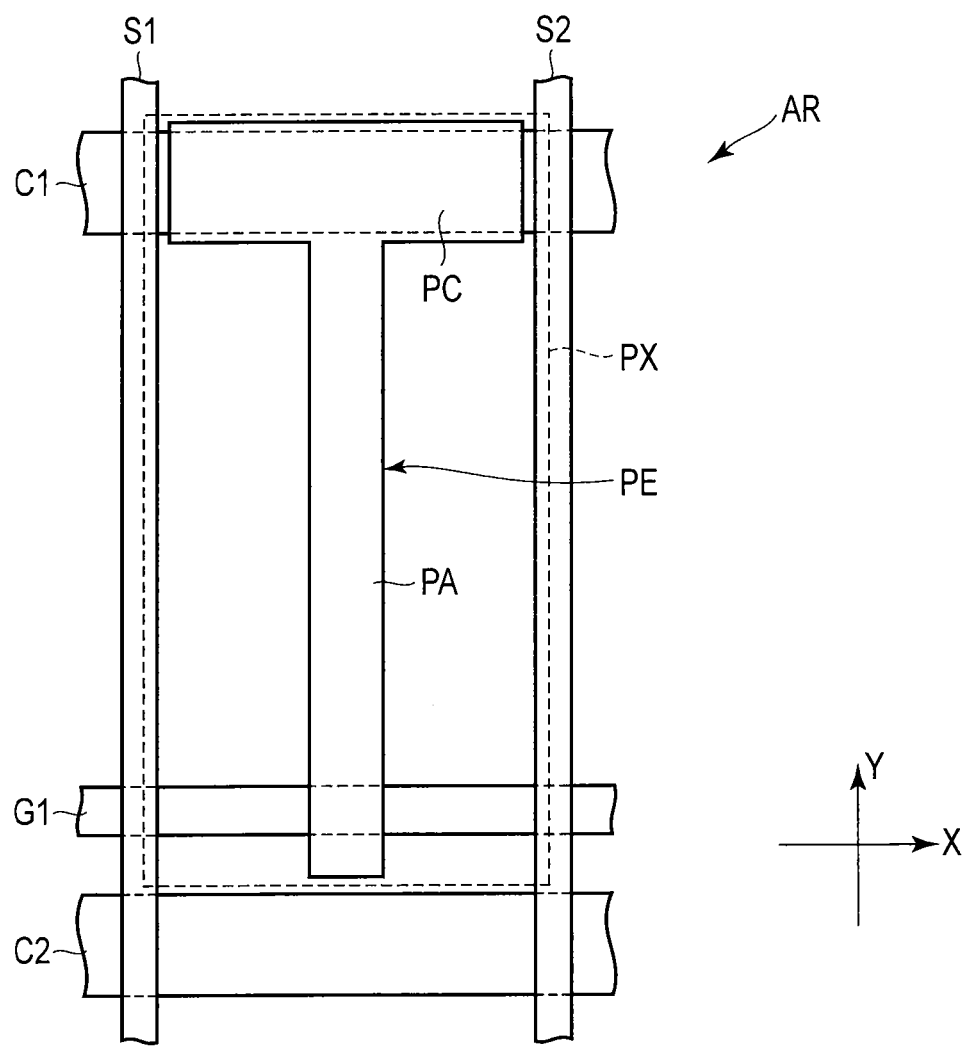
FIG. 3 is a plan view which schematically shows a structure of an array substrate at a time when a pixel of the liquid crystal display panel shown in FIG. 2 is viewed from a counter-substrate side.

FIG. 3 is a plan view which schematically shows a structure of the array substrate AR at a time when the pixel of the liquid crystal display panel LPN shown in FIG. 2 is viewed from the counter-substrate CT side.

A gate line G1, a storage capacitance line C1 and a storage capacitance line C2 extend in the first direction X. A source line S1 and a source line S2 extend in the second direction Y. The gate line G1 is positioned between the storage capacitance line C1 and storage capacitance line C2, and is disposed close to the storage capacitance line C2. Specifically, the distance between the gate line G1 and the storage capacitance line C2 in the second direction Y is smaller than the distance between the gate line G1 and the storage capacitance line C1 in the second direction Y.

In the example illustrated, the pixel PX corresponds to a grid region which is formed by the storage capacitance lines C1 and C2 and the source lines S1 and S2, as indicated by a broken line. The pixel PX has a rectangular shape having a greater length in the second direction Y than in the first direction X. The length of the pixel PX in the first direction X corresponds to a pitch between the source line S1 and source line S2 in the first direction X. The length of the pixel PX in the second direction Y corresponds to a pitch between the storage capacitance line C1 and storage capacitance line C2 in the second direction Y.

In the pixel PX illustrated, the storage capacitance line C1 is disposed at an upper side end portion, the storage capacitance line C2 is disposed at a lower side end portion, the source line S1 is disposed at a left side end portion, and the source line S2 is disposed at a right side end portion. Strictly speaking, the source line S1 is disposed to extend over a boundary between the pixel PX and a pixel neighboring on the left side, and the source line S2 is disposed to extend over a boundary between the pixel PX and a pixel neighboring on the right side. A substantially rectangular transmissive region, which extends in the second direction Y, is formed between the source line S1 and the pixel electrode PE, and between the source line S2 and the pixel electrode PE.

The pixel electrode PE includes a first main electrode PA and a sub-electrode PC. The first main electrode PA and sub-electrode PC are integrally formed as one piece, and are electrically connected to each other. In the meantime, in the example illustrated, only the pixel electrode PE which is disposed in one pixel PX is shown, but pixel electrodes of the same shape are disposed in other pixels, the depiction of which is omitted. The pixel electrode PE is electrically connected to the switching element, for example, at the sub-electrode PC.

The first main electrode PA is formed in a strip shape which linearly extends in the second direction Y. The first main electrode PA is positioned within the pixel PX, on the inside of positions immediately above the source line S1 and source line S2, and is disposed at a substantially middle point between the source line S1 and source line S2. The first main electrode PA extends from the vicinity of the upper side end portion of the pixel PX to the vicinity of the lower side end portion of the pixel PX. In the example illustrated, the first main electrode PA crosses the gate line G1 on the side near the storage capacitance line C2 of the pixel PX, but the first main electrode PA and the gate line G1 are electrically insulated.

The sub-electrode PC is continuous with the first main electrode PA, and is formed in a strip shape which linearly extends in the first direction X. The sub-electrode PC is positioned above the storage capacitance line C1. In other words, the sub-electrode PC is opposed to the storage capacitance line C1, and the storage capacitance line C1 is positioned below the sub-electrode PC. However, the sub-electrode PC and storage capacitance line C1 are electrically insulated. In addition, from another viewpoint, the sub-electrode PC extends from the first main electrode PA toward the source line S1 and source line S2, and is formed in a straight-line shape. The sub-electrode PC may be formed, as shown in FIG. 3, as a part of the pixel electrode PE (i.e. the sub-electrode PC may integrally formed of the same material as, e.g. the first main electrode PA), or may be formed of some other member which is electrically connected to the pixel electrode PE, for example, the same member as the semiconductor layer of the switching element or the same member as the source line. It is desirable that the length of the sub-electrode PC in the first direction X be less than the length of the storage capacitance line C1 in the first direction X between the source line S1 and source line S2, and that the sub-electrode PC overlap neither the source line S1 nor the source line S2.

In the example shown in FIG. 3, the sub-electrode PC is continuous with the upper end of the first main electrode PA, that is, the position overlapping the storage capacitance line C1, and the pixel electrode PE is formed in a T shape. However, in a case where the sub-electrode PC is continuous with an intermediate part of the first main electrode PA, the pixel electrode PE is formed in a cross (+) shape.

Figure 4:
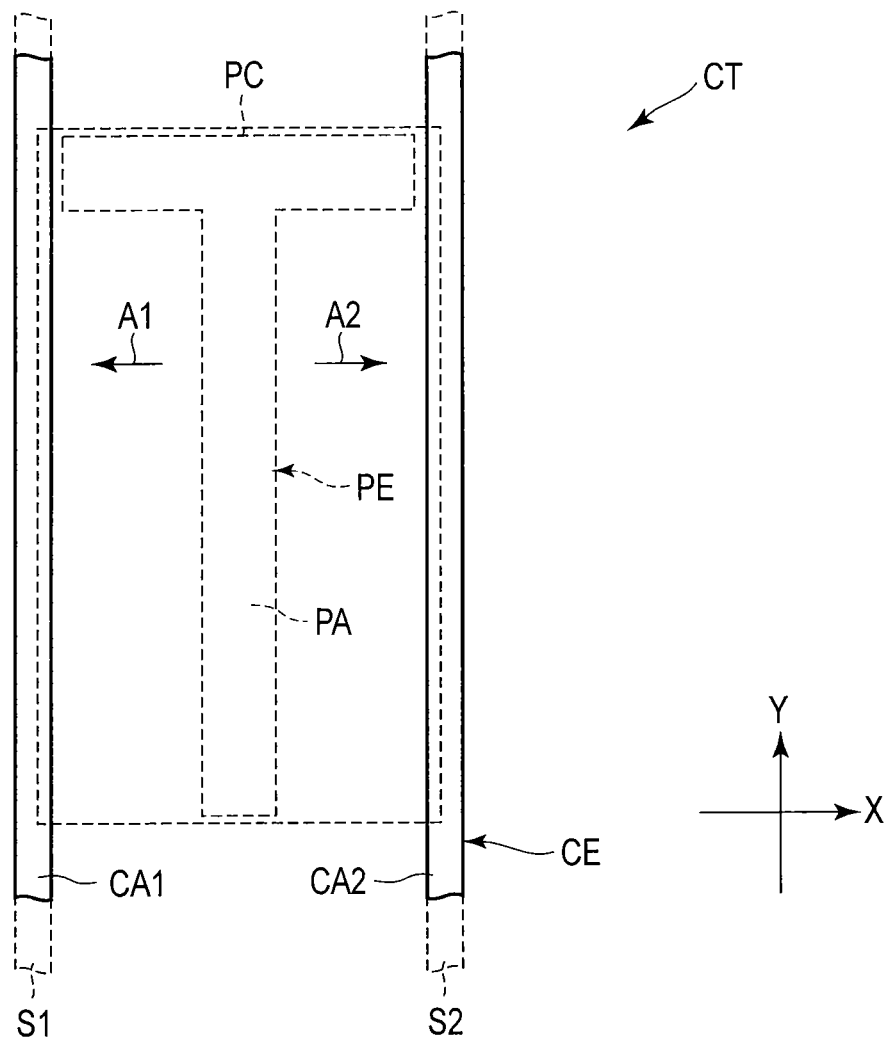
FIG. 4 is a plan view which schematically shows a structure of a pixel on the counter-substrate of the liquid crystal display panel shown in FIG. 2.

FIG. 4 is a plan view which schematically shows the structure of the pixel PX on the counter-substrate CT of the liquid crystal display panel LPN shown in FIG. 2. The pixel electrode PE, source line S1 and source line S2 are depicted by broken lines, in order to explain the positional relationship between the counter-electrode CE and the pixel electrode PE.

The counter-electrode CE includes a second main electrode CA1 and a second main electrode CA2. Each of the second main electrode CA1 and second main electrode CA2 is formed in a strip shape which linearly extends in the second direction Y. The second main electrode CA1 is positioned above the source line S1, and the second main electrode CA2 is positioned above the source line S2. In other words, the second main electrode CA1 is opposed to the source line S1, and the source line S1 is positioned below the second main electrode CA1. In addition, the second main electrode CA2 is opposed to the source line S2, and the source line S2 is positioned below the second main electrode CA2. The second main electrode CA1 and second main electrode CA2 are integrally formed and electrically connected to each other.

The second main electrode CA1 and second main electrode CA2 do not overlap the first main electrode PA of the pixel electrode PE, and are alternately arranged in the first direction X at substantially regular intervals. Specifically, the first main electrode PA is positioned at a substantially middle point between the second main electrode CA1 and second main electrode CA2. In other words, one first main electrode PA is positioned between the neighboring second main electrode CA1 and second main electrode CA2. In short, the second main electrode CA1 and second main electrode CA2 are positioned on both sides of one first main electrode PA. The second main electrode CA1, first main electrode PA and second main electrode CA2 are arranged in the name order in the first direction X from the left side in FIG. 3. The inter-electrode distance between the first main electrode PA and the second main electrode CA1 in the first direction X is substantially equal to the inter-electrode distance between the first main electrode PA and the second main electrode CA2 in the first direction X.

Transmissive regions (aperture portions) of the pixel PX, which mainly contribute to display, are formed between the first main electrode PA and the second main electrode CA1 and between the first main electrode PA and the second main electrode CA2. In the state in which an electric field is produced between the pixel electrode PE and the counter-electrode CE, the main alignment direction of liquid crystal molecules in each aperture portion is a direction which is indicated by an arrow A1 or an arrow A2 in FIG. 4. In short, a plurality of domains, for example, two domains, are formed in one pixel PX.

This phenomenon will be described in greater detail.

Figure 5:
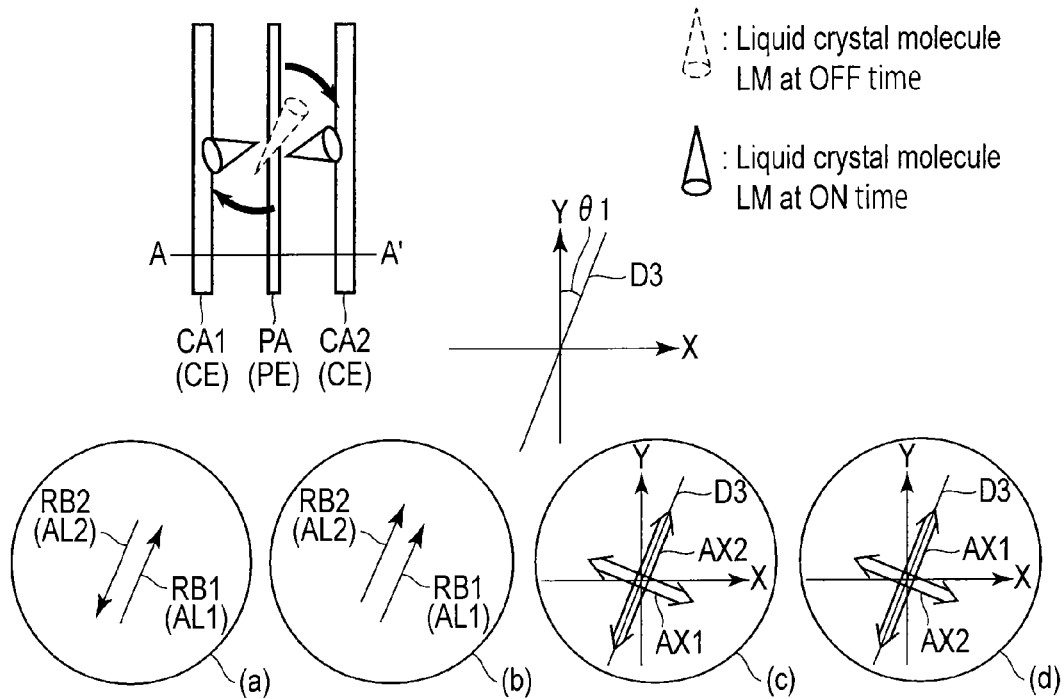
FIG. 5 is a plan view which schematically shows a minimum unit structure in one pixel of a structure example of the embodiment.

FIG. 5 is a plan view which schematically shows a minimum unit structure in one pixel PX of a structure example of the embodiment. In general, a liquid crystal molecule LM has a rod shape or a rugby-ball shape. In this example, however, the liquid crystal molecule LM is schematically depicted in a conical shape.

The pixel electrode PE includes a first main electrode PA extending in the second direction Y. The counter-electrode CE includes a second main electrode CA1 and a second main electrode CA2 which extend in the second direction Y. These first main electrode PA, second main electrode CA1 and second main electrode CA2 are arranged in parallel to each other.

Figure 6:
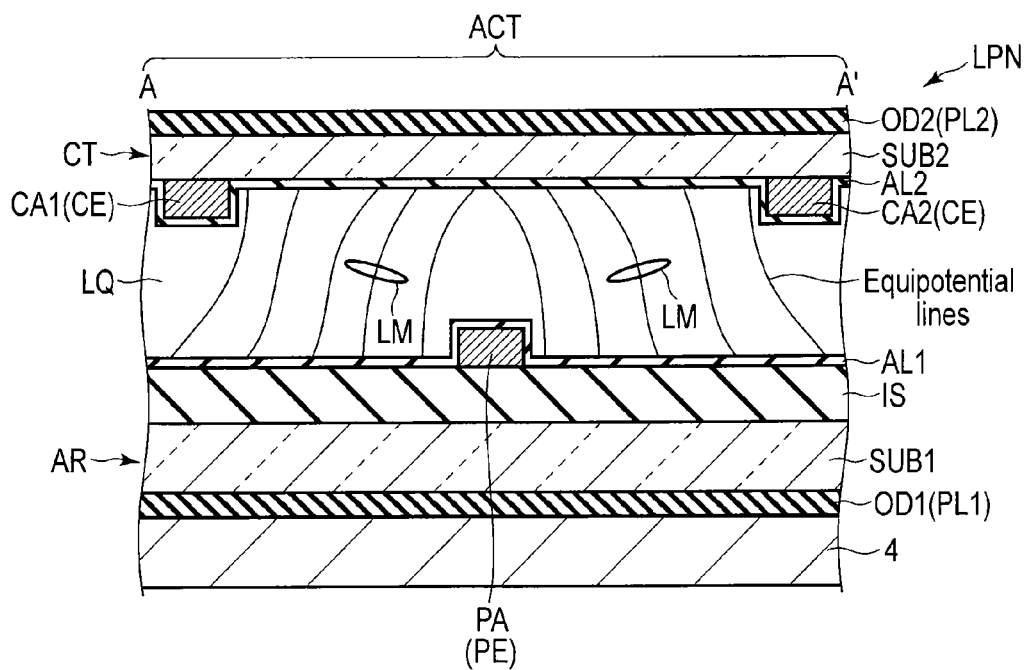
FIG. 6 is a schematic cross-sectional view of a liquid crystal display panel including a first main electrode and a second main electrode, taken along line A-A' in the unit structure shown in FIG. 5.

FIG. 6 is a schematic cross-sectional view of the liquid crystal display panel LPN including the first main electrode PA, second main electrode CA1 and second main electrode CA2, taken along line A-A' in the unit structure shown in FIG. 5. FIG. 6 illustrates equipotential lines in the state in which a potential difference is produced between the first main electrode PA, on one hand, and the second main electrode CA1 and second main electrode CA2, on the other hand.

The array substrate AR is formed by using a first insulative substrate SUB1 having light transmissivity, such as a glass substrate or a plastic substrate. The array substrate AR includes the pixel electrode and a first alignment film AL1, in addition to the switching element, on that side of the first insulative substrate SUB1, which is opposed to the counter-substrate CT.

The pixel electrode PE includes the sub-electrode PC (not shown) in addition to the first main electrode PA which is shown. In the example illustrated, the pixel electrode PE is formed on an insulation layer IS, and the pixel electrode PE is electrically connected to the switching element via a contact hole which is formed in the insulation layer IS.

The first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE. The first alignment film AL1 is formed of a material which exhibits horizontal alignment properties. In order to initially align the liquid crystal molecules LM of the liquid crystal layer LQ, the first alignment film AL1 is subjected to alignment treatment along a first alignment treatment direction RB1 (e.g. rubbing treatment or optical alignment treatment). The first alignment treatment direction RB1, in which the first alignment film AL1 initially aligns the liquid crystal molecules, is set to be a third direction D3 shown in FIG. 5.

On the other hand, the counter-substrate CT is formed by using a second insulative substrate SUB2 having light transmissivity, such as a glass substrate or a plastic substrate. The counter-substrate CT includes the counter-electrode CE and a second alignment film AL2, on that side of the second insulative substrate SUB2, which is opposed to the array substrate AR. Although not illustrated, the counter-substrate CT may include a black matrix which partitions the pixels PX, a color filter layer which is disposed in association with each pixel PX, and an overcoat layer which reduces the effect of asperities on the surface of the color filter layer.

The counter-electrode CE includes the second main electrode CA1 and second main electrode CA2, as illustrated. As shown in FIG. 6, the second main electrode CA1 and second main electrode CA2 are disposed at positions which are displaced from a position immediately above the first main electrode PA. Specifically, the second main electrode CA1 and second main electrode CA2 are disposed on both sides of the position immediately above the first main electrode PA, so that the second main electrode CA1 and second main electrode CA2 may not be opposed to the first main electrode PA.

The second alignment film AL2 is disposed on that surface of the counter-substrate CT, which is opposed to the array substrate AR, and the second alignment film AL2 extends over substantially the entirety of the active area ACT. The second alignment film AL2 covers the counter-electrode CE. The second alignment film AL2 is formed of a material which exhibits horizontal alignment properties. In order to initially align the liquid crystal molecules LM of the liquid crystal layer LQ, the second alignment film AL2 is subjected to alignment treatment along a second alignment treatment direction RB2 (e.g. rubbing treatment or optical alignment treatment). The second alignment treatment direction RB2, in which the second alignment film AL2 initially aligns the liquid crystal molecules, is the same direction as the first alignment treatment direction RB1. In other words, the second alignment treatment direction RB2 is parallel to the third direction D3 in the X-Y plane. In an example shown in part (a) of FIG. 5, the first alignment treatment direction RB1 and second alignment treatment direction RB2 are opposite to each other. In an example shown in part (b) of FIG. 5, the first alignment treatment direction RB1 and second alignment treatment direction RB2 are identical.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant (not shown) in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a positive-type liquid crystal material.

A first optical element OD1 is attached, by, e.g. an adhesive, to the outer surface of the array substrate AR, that is, the outer surface of the first insulative substrate SUB1 which constitutes the array substrate AR. The first optical element OD1 is positioned on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1. In the meantime, another optical element, such as a retardation plate, may be disposed between the first polarizer PL1 and the first insulative substrate SUB1.

A second optical element OD2 is attached, by, e.g. an adhesive, to the outer surface of the counter-substrate CT, that is, the outer surface of the second insulative substrate SUB2 which constitutes the counter-substrate CT. The second optical element OD2 is positioned on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2. In the meantime, another optical element, such as a retardation plate, may be disposed between the second polarizer PL2 and the second insulative substrate SUB2.

The first polarization axis AX1 of the first polarizer PL1 and the second polarization axis AX2 of the second polarizer PL2 have such a positional relationship (crossed-Nicol) that the first polarization axis AX1 and the second polarization axis AX2 are substantially perpendicular to each other. In this case, one of the polarizers is disposed such that the polarization axis thereof is parallel (i.e. parallel to the third direction D3) or perpendicular (i.e. perpendicular to the third direction D3) to the major axis direction of the liquid crystal molecule LM, that is, the first alignment treatment direction RB1 or second alignment treatment direction RB2.

In an example shown in part (c) of FIG. 5, the first polarizer PL1 is disposed such that the first polarization axis AX1 thereof is perpendicular to the third direction D3, and the second polarizer PL2 is disposed such that the second polarization axis AX2 thereof is parallel to the third direction D3. In an example shown in part (d) of FIG. 5, the second polarizer PL2 is disposed such that the second polarization axis AX2 thereof is perpendicular to the third direction D3, and the first polarizer PL1 is disposed such that the first polarization axis AX1 thereof is parallel to the third direction D3.

Thereby, a normally black mode is realized.

An angle $\theta 1$ formed between the second direction Y, in which the first main electrode PA of pixel electrode PE and the second main electrode CA of counter-electrode CE extend, and the third direction, which is parallel to the first alignment treatment direction RB1 and second alignment treatment direction RB2, is 0° or more and is less than 45°. Specifically, the third direction D3 is a direction crossing the second direction Y at an acute angle, but there may be a case in which the third direction D3 is parallel to the second direction Y. For example, from the standpoint of alignment control of liquid crystal molecules LM, it is very effective to set the angle $\theta 1$ at about 0° to 25°, preferably about 10°. In this example, each of the first alignment treatment direction RB1 and second alignment treatment direction RB2 is a direction which is slightly inclined to the second direction Y by several degrees.

At a time of no electric field (at OFF time) when no electric field is produced between the pixel electrode PE and counter-electrode CE, the liquid crystal molecule LM of the liquid crystal layer LQ is aligned such that the major axis thereof is positioned in the first alignment treatment direction RB1 of first alignment film AL1 and the second alignment treatment direction RB2 of second alignment film AL2 in the X-Y plane. This OFF time corresponds to the initial alignment state, and the alignment direction of the liquid crystal molecule LM at the OFF time corresponds to the initial alignment direction. Strictly speaking, the liquid crystal molecule LM is not aligned in parallel to the X-Y plane, and is pre-tilted. Thus, the initial alignment direction of the liquid crystal molecule LM corresponds to a direction in which the major axis of the liquid crystal molecule LM at the OFF time is orthogonally projected onto the X-Y plane.

In this case, each of the first alignment treatment direction RB1 and second alignment treatment direction RB2 is parallel to the third direction D3. Specifically, at the OFF time, the liquid crystal molecule LM is initially aligned such that the major axis thereof is substantially parallel to the third direction D3 in the X-Y plane. The initial alignment direction of the liquid crystal molecule LM is parallel to the third direction D3.

In particular, when the first alignment treatment direction RB1 and the second alignment treatment direction RB2 are parallel and opposite to each other, the liquid crystal molecule LM is aligned such that the major axis thereof is parallel to the third direction D3, as indicated by a broken line in FIG. 5. In addition, at this time, the liquid crystal molecules LM are aligned with substantially equal pre-tilt angles in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, varies depending on the alignment state of liquid crystal molecules LM at a time when the light passes through the liquid crystal layer LQ. However, at the OFF time, the polarization state at the time of incidence is kept until the light has passed through the liquid crystal layer LQ. Thus, at the OFF time, the light, which has passed through the liquid crystal layer LQ, is absorbed by the second polarizer PL2 (black display).

On the other hand, in the state (ON time) in which an electric field is produced between the pixel electrode PE and counter-electrode CE, as shown in FIG. 6, a lateral electric field, which is substantially parallel to the substrates, is produced between the first main electrode PA and second main electrode CA1 and between the first main electrode PA and second main electrode CA2. Thereby, the liquid crystal molecule LM rotates within a plane which is parallel to the substrate major surface, so that the major axis of the liquid crystal molecule LM may become substantially parallel to the direction of the electric field.

In the example shown in FIG. 5, the liquid crystal molecule LM between the first main electrode PA and the second main electrode CA1 rotates along the lateral electric field between the first main electrode PA and the second main electrode CA1, and is so aligned as to be directed leftward in the Figure with respect to the second direction Y. The liquid crystal molecule LM between the first main electrode PA and the second main electrode CA2 rotates along the lateral electric field between the first main electrode PA and the second main electrode CA2, and is so aligned as to be directed rightward in the Figure with respect to the second direction Y.

As has been described above, in the state in which the lateral electric field is produced between the pixel electrode PE and counter-electrode CE in each pixel PX, the liquid crystal molecules LM are aligned in two alignment directions, and domains are formed in the respective alignment directions. Specifically, two domains are formed in each pixel PX.

The polarization state of part of backlight, which is incident on the liquid crystal display panel LPN, varies when the part of backlight has passed through the region between the first main electrode PA and second main electrode CA1 and the region between the first main electrode PA and second main electrode CA2. At such ON time, at least part of the light, which has passed through the liquid crystal layer LQ, passes through the second polarizer PL2 (white display). Specifically, the region between the first main electrode PA and second main electrode CA1 and the region between the first main electrode PA and second main electrode CA2 serve as transmissive regions (or aperture portions) which contribute to display.

According to the present embodiment, since a plurality of domains can be formed in one pixel, viewing angles in plural directions can optically be compensated, and a wider viewing angle can be realized, and the occurrence of gray level inversion can be suppressed. Therefore, a liquid crystal display device which has a good display quality can be provided.

If θ1 is 45° or more, it becomes difficult for the liquid crystal molecules LM to uniformly rotate in the above-described directions in the respective transmissive regions when the electric field is produced between the pixel electrode PE and the counter-electrode CE, and disturbance of alignment tends to easily occur. On the other hand, when θ1 is an acute angle of less than 45°, the liquid crystal molecules LM uniformly rotate in the above-described directions in the respective transmissive regions, even if the intensity of the electric field between the pixel electrode PE and counter-electrode CE is relatively low, and a plurality of domains can stably be formed.

When misalignment occurs between the array substrate AR and the counter-substrate CT, there are cases in which a difference occurs between the inter-electrode distance between the first main electrode PA and second main electrode CA1, on one hand, and the inter-electrode distance between the first main electrode PA and second main electrode CA2, on the other hand. However, since such misalignment commonly occurs in all pixels PX, the electric field distribution does not differ between the pixels PX, and the display of images is not affected.

In addition, even if a large difference occurs in one pixel between the inter-electrode distance between the first main electrode PA and second main electrode CA1, on one hand, and the inter-electrode distance between the first main electrode PA and second main electrode CA2, on the other hand, the rotational direction of liquid crystal molecules LM is identical in the respective transmissive regions, and it is easy to make uniform the alignment of liquid crystal molecules LM in the respective regions. Therefore, it is possible to suppress a decrease in transmittance of the liquid crystal display panel LPN due to, e.g. abnormality in alignment.

In other words, even if misalignment occurs between the array substrate AR and counter-substrate CT, it is possible to keep V-T characteristics substantially constant, which indicate the relation of the transmittance (T) of the liquid crystal display panel LPN to the application voltage (V) between the pixel electrode PE and counter-electrode CE. Thereby, a variance among liquid crystal display panels can be reduced, and the load necessary for adjusting V-T characteristics can also be reduced.

At the ON time, since a lateral electric field is hardly produced in the vicinity of the first main electrode PA of the pixel electrode PE, or in the vicinity of the second main electrode CA1 and second main electrode CA2 of counter-electrode CE (or an electric field enough to drive liquid crystal molecules LM is not produced), the liquid crystal molecules LM hardly move from the third direction D3, as in the case of OFF time. Hence, although the pixel electrode PE and counter-electrode CE are formed of the light-transmissive, electrically conductive material, backlight hardly passes through these regions and hardly contribute to display at the ON time. This being the case, the pixel electrode PE and counter-electrode CE do not always need to be formed of a transparent electrically conductive material, and these may be formed of an electrically conductive material such as aluminum or silver.

FIG. 7 is a schematic cross-sectional view of the liquid crystal display panel LPN, for explaining a pre-tilt angle α of the liquid crystal molecule LM included in the liquid crystal layer LQ. FIG. 7 corresponds to a cross section of the liquid crystal display panel LPN along the third direction D3, and shows only the structure that is necessary for the description.

The first alignment film AL1, which is disposed on the surface of the array substrate AR, is subjected to alignment treatment along the first alignment treatment direction RB1 which is parallel to the third direction D3. The second alignment film AL2, which is disposed on the surface of the counter-substrate CT, is subjected to alignment treatment along the second alignment treatment direction RB2 which is parallel to the third direction D3. The liquid crystal molecule LM has a rod shape extending in one direction.

At the OFF time, the liquid crystal molecules LM of the liquid crystal layer LQ are uniformly aligned. In the present embodiment, the pre-tilt angle α of the liquid crystal molecule LM is defined as an angle formed between a plane (or X-Y plane), which is parallel to the major surface of the array substrate AR, and the major axis of the liquid crystal molecule LM which is positioned near the first alignment film AL1. Of the liquid crystal molecule LM, a top end portion which is raised toward the counter-substrate CT is referred to as "LMT", and a bottom end portion which is fallen toward the array substrate AR is referred to as "LMB".

FIG. 8 is a schematic cross-sectional view of the liquid crystal display panel LPN, for explaining alignment states of liquid crystal molecules LM included in the liquid crystal layer LQ. FIG. 8 corresponds to a cross section of the liquid crystal display panel LPN along the first direction X, and shows only the structure that is necessary for the description. In addition, the example illustrated corresponds to the case in which the inter-electrode distance between the first main electrode PA and the second main electrode CA1 in the first direction X is equal to the inter-electrode distance between the first main electrode PA and the second main electrode CA2 in the first direction X.

In the present embodiment, when the inter-electrode distance between the first main electrode PA and the second main electrode CA1 (or second main electrode CA2) in the first direction X is L, and the cell gap between the array substrate AR and counter-substrate CT, which hold the liquid crystal layer LQ, is GP, an angle Θ, which is expressed by the relationship of tan Θ=GP/L, is greater than the pre-tilt angle α. The inter-electrode distance L, in this case, is a distance in the first direction X from an edge portion of the first main electrode PA to an edge portion of the second main electrode CA1 (or second main electrode CA2) at a time when the liquid crystal display panel LPN is viewed from the counter-substrate CT side. In addition, the cell gap GP, in this case, is a mean value calculated from the retardation of the liquid crystal layer LQ, and is not a value which is actually measured at a specific position.

At the ON time, an oblique electric field is produced with the angle Θ, which is greater than the pre-tilt angle α, between the first main electrode PA and second main electrode CA1, and between the first main electrode PA and second main electrode CA2. In the region between the first main electrode PA and second main electrode CA1 and the region between the first main electrode PA and second main electrode CA2, the liquid crystal molecules LM are aligned and controlled by such an oblique electric field.

Specifically, in the region between the first main electrode PA and second main electrode CA1, the liquid crystal molecule LM rotates by the electric field which is produced between the first main electrode PA and second main electrode CA1, and the liquid crystal molecule LM is aligned such that the top end portion LMT at the OFF time is directed to the array substrate AR side and the bottom end portion LMB is directed to the counter-substrate CT side. In addition, in the region between the first main electrode PA and second main electrode CA2, the liquid crystal molecule LM rotates by the electric field which is produced between the first main electrode PA and second main electrode CA2, and the liquid crystal molecule LM is aligned such that the top end portion LMT at the OFF time is directed to the counter-substrate CT side and the bottom end portion LMB is directed to the array substrate AR side. At this time, as shown in FIG. 8, the liquid crystal molecules LM, which are aligned at the angle Θ, which is greater than the pre-tilt angle α, are included in the region between the first main electrode PA and second main electrode CA1 and the region between the first main electrode PA and second main electrode CA2.

According to the present embodiment, since the angle Θ, which is expressed by the relationship of tan Θ=GP/L, is greater than the pre-tilt angle α of the liquid crystal molecule LM, the force which raises the liquid crystal molecule LM is large, and thus the liquid crystal molecule can smoothly be rotated in the region between the first main electrode PA and second main electrode CA2 and also the liquid crystal molecule can smoothly be rotated in the region between the first main electrode PA and second main electrode CA1.

As a result, the rotational directions of liquid crystal molecules LM can be made uniform in the region between the first main electrode PA and second main electrode CA2 and the region between the first main electrode PA and second main electrode CA1. Therefore, at the OFF time and ON time, the alignment of liquid crystal molecules LM can be stabilized, and the decrease in transmittance of the liquid crystal display panel due to abnormality in alignment can be suppressed.

The pre-tilt angle α is set by, for example, the alignment restriction force of the material of which the first alignment film AL1 and second alignment film AL2 are formed, the condition for alignment treatment, and the dielectric constant anisotropy of liquid crystal molecules LM. In this embodiment, the pre-tilt angle α is set at an angle which is 1° or more and 10° or less.

The angle Θ, as described above, is set by the cell gap GP and the inter-electrode distance L. In this embodiment, the angle Θ is set at an angle which is greater than 0° and less than 45°.

Next, another structure example of the present embodiment is described. A description of the same structure (e.g. gate lines, storage capacitance lines, and source lines) as the above-described structure example is omitted.

FIG. 9 is a plan view which schematically shows a minimum unit structure in one pixel PX of another structure example of the embodiment.

The pixel electrode PE includes a first main electrode PA and a second main electrode PB. The first main electrode PA and second main electrode PB extend in directions which are different from the first direction X in which gate lines (not shown) extend and the second direction Y in which source lines (not shown) extend. To be more specific, the first main electrode PA has a strip shape extending along a third direction D3 which crosses the second direction Y at an acute angle clockwise from the second direction Y. The second main electrode PB has a strip shape extending along a fourth direction D4 which crosses the second direction Y at an acute angle counterclockwise from the second direction Y. The first main electrode PA and second main electrode PB are connected at their end portions. Accordingly, the pixel electrode PE has a substantially V shape.

The counter-electrode CE includes a third main electrode CA and a fourth main electrode CB, which extend in directions which are different from the first direction X and the second direction Y. The third main electrode CA has a strip shape extending along the third direction D3, and is parallel to the first main electrode PA. The fourth main electrode CB has a strip shape extending along the fourth direction D4, and is parallel to the second main electrode PB. The third main electrode CA and fourth main electrode CB are connected at their end portions. Accordingly, the counter-electrode CE, like the pixel electrode PE, has a substantially V shape.

In the illustrated example, two third main electrodes CA are arranged along the first direction X. In the description below, in order to distinguish the two third main electrodes CA, the third main electrode shown on the left side is denoted by CA1, and the third main electrode shown on the right side is denoted by CA2. Similarly, two fourth main electrodes CB are arranged along the first direction X. In the description below, in order to distinguish the two fourth main electrodes CB, the fourth main electrode shown on the left side is denoted by CB1, and the fourth main electrode shown on the right side is denoted by CB2. The third main electrode CA1 and fourth main electrode CB1 are connected, and the third main electrode CA2 and fourth main electrode CB2 are connected. The third main electrode CA1 and third main electrode CA2, and the fourth main electrode CB1 and fourth main electrode CB2, are all electrically connected. In short, the counter-electrode CE is formed in a comb shape.

One first main electrode PA is positioned between the neighboring third main electrode CA1 and third main electrode CA2. Specifically, the third main electrode CA1 and third main electrode CA2 are disposed on both sides of a position immediately above the first main electrode PA. Accordingly, the third main electrode CA1, first main electrode PA and third main electrode CA2 are alternately arranged along the first direction X. The first main electrode PA, third main electrode CA1 and third main electrode CA2 are arranged in parallel to each other. The inter-electrode distance between the third main electrode CA1 and the first main electrode PA in the first direction X is substantially equal to the inter-electrode distance between the third main electrode CA2 and the first main electrode PA in the first direction X.

One second main electrode PB is positioned between the neighboring fourth main electrode CB1 and fourth main electrode CB2. Specifically, the fourth main electrode CB1 and fourth main electrode CB2 are disposed on both sides of a position immediately above the second main electrode PB. Accordingly, the fourth main electrode CB1, second main electrode PB and fourth main electrode CB2 are alternately arranged along the first direction X. The second main electrode PB, fourth main electrode CB1 and fourth main electrode CB2 are arranged in parallel to each other. The inter-electrode distance between the fourth main electrode CB1 and the second main electrode PB in the first direction X is substantially equal to the inter-electrode distance between the fourth main electrode CB2 and the second main electrode PB in the first direction X.

It is desirable that an angle θ1 formed between the second direction Y and the third direction D3, and an angle θ2 formed between the second direction Y and the fourth direction D4, be greater than 0° and less than 45°. The formed angle θ1 and the formed angle θ2 may be equal. In this case, when the length of the first main electrode PA and the length of the second main electrode PB are equal, the pixel electrode PE has a line-symmetric shape with respect to a boundary line along the first direction X between the first main electrode PA and second main electrode PB. In addition, in this case, when the length of the third main electrode CA1 and the length of the fourth main electrode CB1 are equal and the length of the third main electrode CA2 and the length of the fourth main electrode CB2 are equal, the counter-electrode CE has a line-symmetric shape with respect to a boundary line along the first direction X between the third main electrode CA and fourth main electrode CB.

The first alignment treatment direction RB1 of the first alignment film AL1, which covers the pixel electrode PE, and the second alignment treatment direction RB2 of the second alignment film AL2, which covers the counter-electrode CE, are parallel to each other, and are parallel to, for example, the second direction Y. In an example shown in part (a) of FIG. 9, the first alignment treatment direction RB1 and the second alignment treatment direction RB2 are parallel and opposite to each other. In an example shown in part (b) of FIG. 9, the first alignment treatment direction RB1 and second alignment treatment direction RB2 are parallel and identical.

In the other structural aspects, this structure example is the same as the above-described structure example, so a description thereof is omitted here.

In this structure example, at the OFF time, the liquid crystal molecules LM of the liquid crystal layer LQ are aligned in a direction parallel to the first alignment treatment direction RB1 and second alignment treatment direction RB2. In this case, as indicated by broken lines, the liquid crystal molecules LM are aligned such that the major axes thereof are parallel to the second direction Y. At this time, black display is effected, like the above-described structure example.

On the other hand, at the ON time, a lateral electric field, which is substantially parallel to the substrates, is produced between the first main electrode PA and third main electrode CA1 and between the first main electrode PA and third main electrode CA2. Similarly, a lateral electric field, which is substantially parallel to the substrates, is produced between the second main electrode PB and fourth main electrode CB1 and between the second main electrode PB and fourth main electrode CB2. Thereby, the liquid crystal molecule LM rotates within a plane which is parallel to the substrate major surface, so that the major axis of the liquid crystal molecule LM may become substantially parallel to the direction of the electric field.

In the example shown in FIG. 9, the liquid crystal molecule LM between the first main electrode PA and the third main electrode CA1 rotates counterclockwise along the lateral electric field between the first main electrode PA and the third main electrode CA1, and is so aligned as to be directed to the upper left side in the Figure. The liquid crystal molecule LM between the first main electrode PA and the third main electrode CA2 rotates counterclockwise along the lateral electric field between the first main electrode PA and the third main electrode CA2, and is so aligned as to be directed to the lower right side in the Figure.

In addition, the liquid crystal molecule LM between the second main electrode PB and the fourth main electrode CB1 rotates clockwise along the lateral electric field between the second main electrode PB and the fourth main electrode CB1, and is so aligned as to be directed to the lower left side in the Figure. The liquid crystal molecule LM between the second main electrode PB and the fourth main electrode CB2 rotates clockwise along the lateral electric field between the second main electrode PB and the fourth main electrode CB2, and is so aligned as to be directed to the upper right side in the Figure.

As has been described above, in the state in which the lateral electric field is produced between the pixel electrode PE and counter-electrode CE in each pixel PX, the liquid crystal molecules LM are aligned in four alignment directions, and domains are formed in the respective alignment directions. Specifically, four domains are formed in each pixel PX.

At this time, the polarization state of part of backlight, which is incident on the liquid crystal display panel LPN, varies when the part of backlight has passed through the region between the first main electrode PA and third main electrode CA1, the region between the first main electrode PA and third main electrode CA2, the region between the second main electrode PB and fourth main electrode CB1, and the region between the second main electrode PB and fourth main electrode CB2. The light emerging from the liquid crystal layer LQ passes through the second polarizer PL2, thus effecting white display.

According to this structure example of the embodiment, the same advantageous effects as with the above-described structure example can be obtained. Moreover, since four domains can be formed in one pixel, viewing angles in four directions can optically be compensated, and a wider viewing angle can be realized, and the occurrence of gray level inversion can be suppressed. Therefore, a liquid crystal display device which has a good display quality can be provided.

FIG. 10 is a schematic cross-sectional view of the liquid crystal display panel LPN, for explaining alignment states of liquid crystal molecules LM included in the liquid crystal layer LQ. A cross-sectional view shown in part (a) of FIG. 10 corresponds to a cross section of the liquid crystal display panel LPN, taken along line B-B' along the first direction X in FIG. 9. A cross-sectional view shown in part (b) of FIG. 10 corresponds to a cross section of the liquid crystal display panel LPN, taken along line C-C' along the first direction X in FIG. 9. These cross-sectional views show only the structure that is necessary for the description.

In addition, the example illustrated corresponds to the case in which the inter-electrode distance between the first main electrode PA and third main electrode CA1 in the first direction X, the inter-electrode distance between the first main electrode PA and third main electrode CA2 in the first direction X, the inter-electrode distance between the second main electrode PB and fourth main electrode CB1 in the first direction X, and the inter-electrode distance between the second main electrode PB and fourth main electrode CB2 in the first direction X, are all equal.

Also in this structure example, when the inter-electrode distance between the first main electrode PA and the third main electrode CA1 (or third main electrode CA2) in the first direction X is L, and the cell gap between the array substrate AR and counter-substrate CT, which hold the liquid crystal layer LQ, is GP, an angle $\Theta$, which is expressed by the relationship of $\tan\Theta = GP/L$, is greater than a pre-tilt angle $\alpha$ of the liquid crystal molecule LM. Besides, when the inter-electrode distance between the second main electrode PB and the fourth main electrode CB1 (or fourth main electrode CB2) in the first direction X is L, and the cell gap between the array substrate AR and counter-substrate CT, which hold the liquid crystal layer LQ, is GP, an angle $\Theta$, which is expressed by the relationship of $\tan\Theta = GP/L$, is greater than a pre-tilt angle $\alpha$ of the liquid crystal molecule LM.

At the ON time, an oblique electric field is produced with the angle $\Theta$, which is greater than the pre-tilt angle $\alpha$, between the first main electrode PA and third main electrode CA1, between the first main electrode PA and third main electrode CA2, between the second main electrode PB and fourth main electrode CB1, and between the second main electrode PB and fourth main electrode CB2. The liquid crystal molecules LM are aligned and controlled by such an oblique electric field in the transmissive regions between the first main electrode PA and third main electrode CA1, between the first main electrode PA and third main electrode CA2, between the second main electrode PB and fourth main electrode CB1, and between the second main electrode PB and fourth main electrode CB2.

Specifically, in the transmissive region between the first main electrode PA and third main electrode CA1, the liquid crystal molecule LM rotates by the electric field which is produced between the first main electrode PA and third main electrode CA1, and the liquid crystal molecule LM is aligned such that the top end portion LMT at the OFF time is directed to the counter-substrate CT side and the bottom end portion LMB is directed to the array substrate AR side. In the transmissive region between the first main electrode PA and third main electrode CA2, the liquid crystal molecule LM rotates by the electric field which is produced between the first main electrode PA and third main electrode CA2, and the liquid crystal molecule LM is aligned such that the top end portion LMT at the OFF time is directed to the array substrate AR side and the bottom end portion LMB is directed to the counter-substrate CT side.

In addition, in the transmissive region between the second main electrode PB and fourth main electrode CB1, the liquid crystal molecule LM rotates by the electric field which is produced between the second main electrode PB and fourth main electrode CB1, and the liquid crystal molecule LM is aligned such that the top end portion LMT at the OFF time is directed to the array substrate AR side and the bottom end portion LMB is directed to the counter-substrate CT side. In the transmissive region between the second main electrode PB and fourth main electrode CB2, the liquid crystal molecule LM rotates by the electric field which is produced between the second main electrode PB and fourth main electrode CB2, and the liquid crystal molecule LM is aligned such that the top end portion LMT at the OFF time is directed to the counter-substrate CT side and the bottom end portion LMB is directed to the array substrate AR side.

In this structure example, too, the same advantageous effects as in the above-described structure example can be obtained.

In the present embodiment, when the first alignment treatment direction RB1 and the second alignment treatment direction RB2 are parallel and opposite to each other, the liquid crystal molecules LM are homogeneously aligned at the OFF time. When the first alignment treatment direction RB1 and the second alignment treatment direction RB2 are parallel to the third direction D3 and are identical, the liquid crystal molecules LM are aligned at the OFF time such that their major axes are parallel to the third direction D3. In addition, at this time, the liquid crystal molecules LM are aligned, as illustrated in FIG. 11, with such a pre-tilt angle $\alpha$ that the liquid crystal molecules LM are substantially horizontally aligned in the middle part of the liquid crystal layer LQ and the liquid crystal molecules LM become symmetric in the vicinity of the first alignment film AL1 and in the vicinity of the second alignment film AL2, with respect to the middle part as the boundary (splay alignment). In the present embodiment, as has been defined with reference to FIG. 7, the pre-tilt angle $\alpha$ is an angle formed between the major axis of the liquid crystal molecule LM, which is positioned near the first alignment film AL1, and the plane, which is parallel to the major surface of the array substrate AR, and the alignment of liquid crystal molecules in the middle part of the liquid crystal layer LQ is ignored.

Next, Example 1 and Example 2 are described.

Example 1

An array substrate AR including a pixel electrode PE having a shape as shown in FIG. 3 was prepared. As regards the array substrate AR, a first alignment film AL1, which covers the pixel electrode PE and exhibits horizontal alignment properties, was formed and subjected to alignment treatment along the first alignment treatment direction RB1 that is parallel to the third direction D3.

On the other hand, a counter-substrate CT including a counter-electrode CE having a shape as shown in FIG. 4 was prepared. As regards the counter-substrate CT, a second alignment film AL2, which covers the counter-electrode CE and exhibits horizontal alignment properties, was formed and subjected to alignment treatment along the second alignment treatment direction RB2 that is parallel to the third direction D3 and is opposite to the first alignment treatment direction RB1 (homogeneous alignment treatment).

A cell gap GP of 5.0 μm was created between the array substrate AR and the counter-substrate CT, and the array substrate AR and the counter-substrate CT were attached. At this time, the inter-electrode distance L between each main electrode of the pixel electrode PE and each main electrode of the counter-electrode CE was set at 10 μm. A positive-type liquid crystal material (manufactured by Merck & Co., Ltd.) was injected between the array substrate AR and the counter-substrate CT, and a liquid crystal display panel was fabricated.

In this case, the angle $\Theta$, which is expressed by the relationship of $\tan \Theta = GP/L$, is 27°. The pre-tilt angle $\alpha$ of the liquid crystal molecule LM in the vicinity of the first alignment film AL1 was set at 5°.

According to Example 1, it was confirmed that a uniform display quality, which does not depend on the degree of misalignment in assembly, can be obtained. In addition, liquid crystal panels LPN, in which the pre-tilt angle $\alpha$ was set at 1°, 3°, 7° and 10°, respectively, were fabricated, and the display quality thereof was confirmed. It was confirmed that in each of these liquid crystal display panels LPN, a uniform display quality, which does not depend on the degree of misalignment in assembly, can be obtained.

Example 2

A liquid crystal display panel LPN was fabricated under the same conditions as in Example 1, except that the second alignment treatment direction RB2 of the second alignment film AL2 was set to be identical to the first alignment treatment direction RB1. In this case, the angle $\Theta$, which is expressed by the relationship of $\tan \Theta = GP/L$, is 27°. The pre-tilt angle $\alpha$ of the liquid crystal molecule LM in the vicinity of the first alignment film AL1 was set at 5°.

According to Example 2, it was confirmed that a uniform display quality, which does not depend on the degree of misalignment in assembly, can be obtained. In addition, liquid crystal panels LPN, in which the pre-tilt angle $\alpha$ was set at 1°, 3°, 7° and 10°, respectively, were fabricated, and the display quality thereof was confirmed. It was confirmed that in each of these liquid crystal display panels LPN, a uniform display quality, which does not depend on the degree of misalignment in assembly, can be obtained.

As has been described above, according to the present embodiment, a liquid crystal display device which has a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate comprising a gate line, a first storage capacitance line, and a second storage capacitance line which extend in a first direction, a first source line and a second source line which extend in a second direction perpendicular to the first direction, a T-shaped pixel electrode comprising a strip-shaped first main electrode, which is positioned midway between the first source line and the second source line and extends in the second direction, and a strip-shaped sub-electrode, which is continuous with the first main electrode, is positioned above the first storage capacitance line and extends in the first direction, and a first alignment film formed of a material which exhibits horizontal alignment properties, the first alignment film covering the pixel electrode;
a second substrate comprising a counter-electrode which comprises a strip-shaped second main electrode positioned above the first source line and the second source line and extending in the second direction, and a second alignment film formed of a material which exhibits horizontal alignment properties, the second alignment film covering the counter-electrode; and
a liquid crystal layer comprising a liquid crystal molecule held in a cell gap between the first substrate and the second substrate,
wherein when an inter-electrode distance in the first direction between the first main electrode and the second main electrode is L and the cell gap is GP, a formed angle $\Theta$, which is expressed by a relationship of $\tan \Theta = GP/L$, is greater than a pre-tilt angle $\alpha$ of the liquid crystal molecule,
a first distance between the gate line and the second storage capacitance line in the second direction is smaller than a second distance between the gate line and the first storage capacitance line in the second direction,
the first main electrode crosses the gate line, and extends toward the second storage capacitance line beyond the gate line, and
a length of the sub-electrode along the first direction is the same as or less than a length of the first storage capacitance line which is between the first source line and the second source line along the first direction, a width of the sub-electrode along the second direction is greater than a width of the first storage capacitance line, and the sub-electrode is disposed to cover the first storage capacitance line between the first source line and the second source line.

2. The liquid crystal display device of claim 1, wherein the liquid crystal molecule is initially aligned along a third direction at an OFF time when no electric field is produced between the pixel electrode and the counter-electrode, and an angle $\theta 1$ formed between the second direction and the third direction is 0° or more and is less than 45°.

3. The liquid crystal display device of claim 2, further comprising a first polarizer which is disposed on an outer surface of the first substrate and has a first polarization axis, and a second polarizer which is disposed on an outer surface of the second substrate and has a second polarization axis, the second polarization axis and the first polarization axis are substantially perpendicular,
wherein the first polarization axis or the second polarization axis is set to be parallel to the third direction.

4. The liquid crystal display device of claim 3, wherein a first alignment treatment direction of the first alignment film and a second alignment treatment direction of the second alignment film are parallel to the third direction and are opposite to each other.

5. The liquid crystal display device of claim 3, wherein a first alignment treatment direction of the first alignment film and a second alignment treatment direction of the second alignment film are parallel to the third direction and are identical.

6. The liquid crystal display device of claim 1, wherein the pre-tilt angle $\alpha$ is 1° or more and 10° or less.

7. The liquid crystal display device of claim 1, wherein the formed angle $\Theta$ is greater than 0° and less than 45°.

8. A liquid crystal display device comprising:
a first substrate comprising a gate line extending in a first direction, a first source line and a second source line which extend in a second direction perpendicular to the first direction, a pixel electrode comprising a strip-shaped first main electrode, which is positioned midway between the first source line and the second source line and extends in the second direction, and a sub-electrode extending from the first main electrode toward the first source line and the second source line, and a first alignment film formed of a material which exhibits horizontal alignment properties, the first alignment film covering the pixel electrode;
a second substrate comprising a counter-electrode which comprises a strip-shaped second main electrode positioned above the first source line and the second source line and extending in the second direction, and a second alignment film formed of a material which exhibits horizontal alignment properties, the second alignment film covering the counter-electrode; and
a liquid crystal layer comprising a liquid crystal molecule held in a cell gap between the first substrate and the second substrate,
wherein when an inter-electrode distance in the first direction between the first main electrode and the second main electrode is L and the cell gap is GP, a formed angle $\Theta$, which is expressed by a relationship of $\tan \Theta = GP/L$, is greater than a pre-tilt angle $\alpha$ of the liquid crystal molecule,
wherein the first substrate further comprises a first storage capacitance line and a second storage capacitance line which extend in the first direction,
the first storage capacitance line is positioned below the sub-electrode,
a first distance between the gate line and the second storage capacitance line in the second direction is smaller than a second distance between the gate line and the first storage capacitance line in the second direction,
the first main electrode crosses the gate line, and extends toward the second storage capacitance line beyond the gate line, and a length of the sub-electrode along the first direction is the same as or less than a length of the first storage capacitance line which is between the first source line and the second source line along the first direction, a width of the sub-electrode along the second direction is greater than a width of the first storage capacitance line, and the sub-electrode is disposed to cover the first storage capacitance line between the first source line and the second source line.

9. The liquid crystal display device of claim 8, wherein the liquid crystal molecule is initially aligned along a third direction at an OFF time when no electric field is produced between the pixel electrode and the counter-electrode, and an angle θ1 formed between the second direction and the third direction is 0° or more and is less than 45°.

10. The liquid crystal display device of claim 9, further comprising a first polarizer which is disposed on an outer surface of the first substrate and has a first polarization axis, and a second polarizer which is disposed on an outer surface of the second substrate and has a second polarization axis, the second polarization axis and the first polarization axis are substantially perpendicular, wherein the first polarization axis or the second polarization axis is set to be parallel to the third direction.

11. The liquid crystal display device of claim 10, wherein a first alignment treatment direction of the first alignment film and a second alignment treatment direction of the second alignment film are parallel to the third direction and are opposite to each other.

12. The liquid crystal display device of claim 10, wherein a first alignment treatment direction of the first alignment film and a second alignment treatment direction of the second alignment film are parallel to the third direction and are identical.

13. The liquid crystal display device of claim 8, wherein the pre-tilt angle α is 1° or more and 10° or less.

14. The liquid crystal display device of claim 8, wherein the formed angle Θ is greater than 0° and less than 45°.

* * * * *